(No Model.)  2 Sheets—Sheet 1.

T. R. COOK.
AUTOMATIC GATE.

No. 308,752. Patented Dec. 2, 1884.

WITNESSES.
James B. Lizius.
E. W. Bradford.

INVENTOR.
Thomas R. Cook,
PER
C. Bradford,
ATTORNEY.

(No Model.) 2 Sheets—Sheet 2.

T. R. COOK.
AUTOMATIC GATE.

No. 308,752. Patented Dec. 2, 1884.

WITNESSES.
James B. Liguis.
E. W. Bradford.

INVENTOR.
Thomas R. Cook,
PER
C. Bradford,
ATTORNEY.

UNITED STATES PATENT OFFICE.

THOMAS R. COOK, OF ARCADIA, INDIANA.

AUTOMATIC GATE.

SPECIFICATION forming part of Letters Patent No. 308,752, dated December 2, 1884.

Application filed August 21, 1883. (No model.)

*To all whom it may concern:*

Be it known that I, THOMAS R. COOK, of the town of Arcadia, county of Hamilton, and State of Indiana, have invented certain new and useful Improvements in Automatic Gates, of which the following is a specification.

My said invention relates to that class of automatic gates which always swing from the team as it approaches in either direction; and it consists in certain improvements in the construction and arrangement of the operating mechanism, as will be hereinafter more particularly described.

Figure 1:
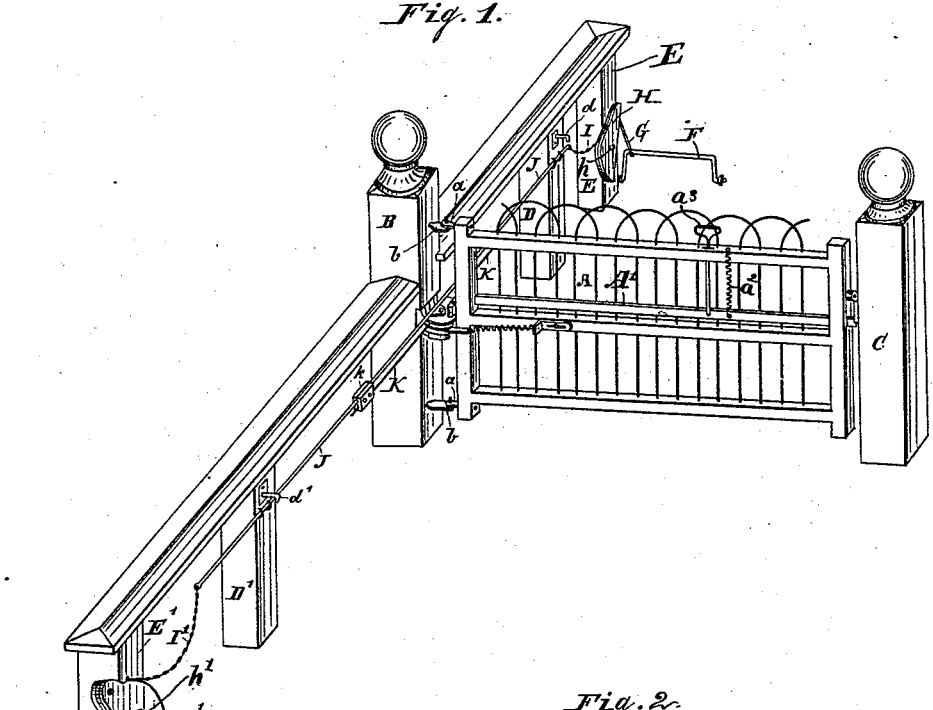
Figure 2:
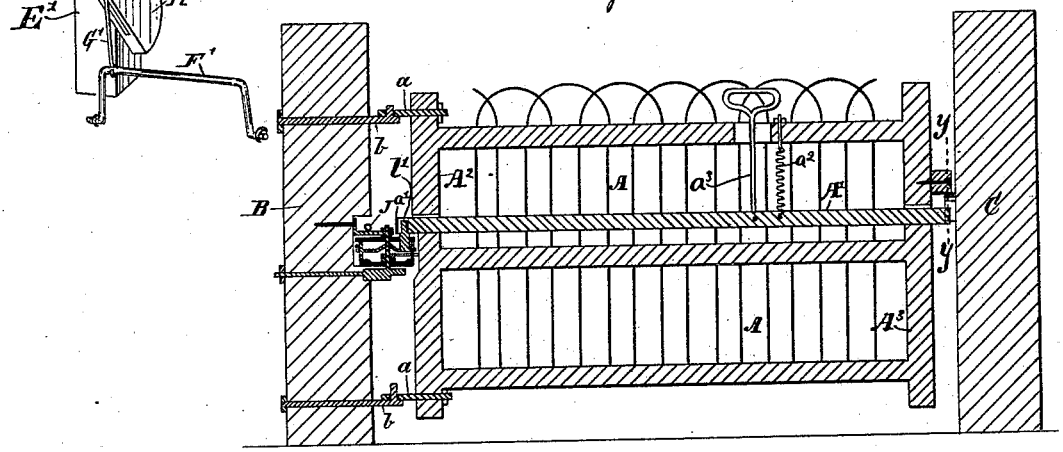
Figure 3:
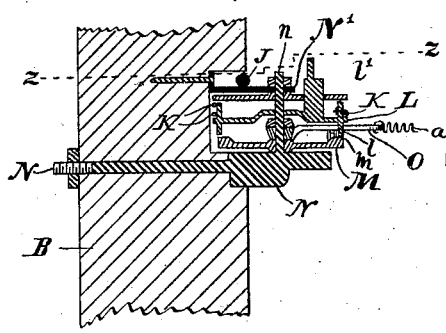
Figure 4:
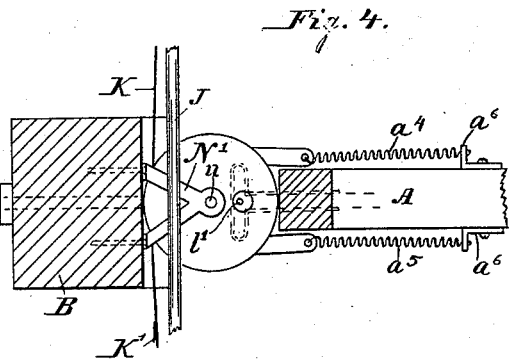
Figure 5:
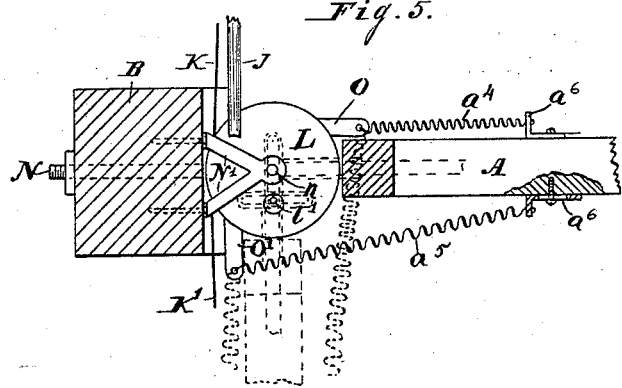
Figure 6:
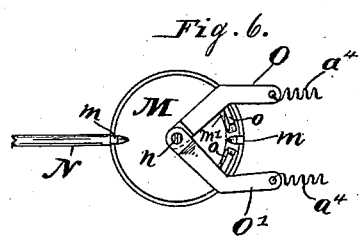
Figure 7:
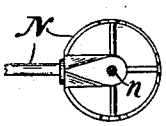
Figure 8:
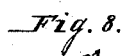
Figure 9:
Figure 10:
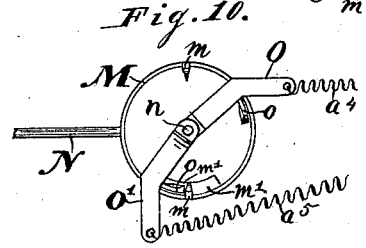
Figure 11:
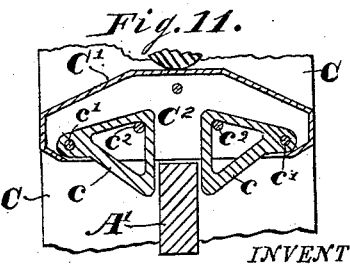

Referring to the accompanying drawings, which are made a part hereof, and on which similar letters of reference indicate similar parts, Figure 1 is a perspective view of a gate and its posts and operating mechanism embodying my invention; Fig. 2, a longitudinal vertical section of said gate, &c.; Fig. 3, a detail view, similar to a portion of Fig. 2, on an enlarged scale; Fig. 4, a detail view looking downwardly from the dotted line $z\,z$ in Fig. 3, the mechanism, as in the preceding figures, being in the position it occupies when the gate is closed; Fig. 5, a view similar to Fig. 4, except that the mechanism is in the position it occupies after it has been operated to open the gate, the gate itself being shown as not having started; Fig. 6, a top or plan view of the arms which operate to pull the gate around and that portion of the mechanism below them; Fig. 7, a plan of the supporting and holding plate and bolt. Fig. 8, a front elevation of the operating mechanism; Fig. 9, a perspective view of one of the arms and the dog attached thereto; Fig. 10, a view like Fig. 6, except that the parts are in the position they occupy in Fig. 5; and Fig. 11, a view of the catches, &c., as seen when looking toward the right from the dotted line $y\,y$ in Fig. 2.

In said drawings, the portions marked A represent the gate; B, the post on which it is hung; C, the post upon which are the catches that hold it shut; D D', the posts against which it rests when open; E E', posts on which a part of the mechanism is mounted; F F', bail-like rods over which the wheels or runners of the vehicles pass; G G', rods connecting said rods F F' with segmental wheels mounted on the posts E E'; H H', said segmental wheels; I I', chains connecting said segmental wheels with an operating-bar; J, said operating-bar; K, a chain or rope connecting said operating-bar with the main wheel of the operating mechanism; L, the said wheel; M, a disk for operating the pawls which hold the mechanism in operated position; N, a combined supporting bolt and plate having notches in the plate portion with which the pawls engage, and O O' the arms through which the mechanism operates directly on the gate.

The gate A is of any suitable construction, and is hinged to the post B in any desired manner, preferably by hinges composed of the parts $a$ and $b$. It is provided with a latch, A', which is preferably a straight bar passing loosely through mortises in the uprights $A^2$ and $A^3$, and having a device, $a'$, upon its rear end provided with a slot running transversely across the end of the latch, by means of which it is operated, as will be presently described. It is also preferably supported at its forward end by a spring, $a^2$, and provided with a handle, $a^3$, by means of which a person on foot may unlatch the gate and pass through without operating the mechanism. The post B is any suitable post of a sufficient size and strength to support the gate. About half-way between the hinges upon the inside is secured that portion of the mechanism for operating the gate which embodies the leading features of my present invention. The post C has upon the inside face a catch, C', which consists of two duplicate parts, $c\,c$, which are preferably hollow triangular devices pivoted at one corner to the outside corners of the housing $C^2$ by pivots $c'\,c'$. Studs or pins $c^2$ are placed within the openings in these devices, so that when resting thereon the inside faces of the devices will be perpendicular, and their lower parts will present a slanting face to the latch when approaching from either direction. Thus the latch will act upon this part to rotate the device upon its pivot and raise its inner portion, which allows the latch to pass under, when the device will immediately fall back until it rests upon the stud or pin $c^2$, when its front face will be perpendicular, as before stated, and the gate is thereby secured in a closed position until the latch is disengaged, as will be presently described. The posts D and D' are stationed at either side of the post B a distance equal to the length of the gate, and are provided respectively with catches $d$ and $d'$, with which the latch of the gate engages, when said gate is swung back and is held open until the team has passed. They are also provided with suitable bearings for the rod J. The posts E and E' are stationed any distance from the gate that it is desired to place the bail-like rods F and F'. The bail-like rods F and F' are secured in position in the ordinary manner, and are connected to the wheels H and H' by rods, chains, or ropes G and G'. The segmental wheels H and H' are pivoted to the posts E E' in such a manner that they shall be heaviest opposite the point of attachment to the rods G and G', and thus serve to hold the bail-like rods F F' in an upright position, except while being operated upon. The pivots $h$ $h'$ of these wheels are located at points so much nearer the gate than are the fastenings of the rods F F' as is equal to one-half the height of said rods from the ground, when said rods are upright. This arrangement causes said rods, when pressed toward the gate to open it, and when pressed from the gate to shut it, operating, of course, through the other mechanism. The chains or ropes I I' connect the segmental wheels H H' with the ends of the bar J. The operating-bar J is a straight bar, as shown, being movably mounted in suitable bearings on the posts D D'. At a suitable distance from the gate, on either side of the post B, clamps $k$ are adjustably secured for holding a wire or other rope, K, which passes around the drum L, and thus rotates said drum when the bar J is drawn in either direction. The clamps $k$ are adjustable on the rods J for the purpose of lengthening or shortening the wire or rope K, when it is found necessary to do so. The drum L is mounted on the spindle $n$, and is adapted to revolve thereon. The wire rope K is secured to the face of this drum at the side next the gate, and passes around to the side next the post B in both directions, each end passing the other at this point, and extending out to a suitable point on the bar J, to which it is secured by the clamps $k$. Said rope thus makes a complete turn around said drum, or a one-half turn on each side of said fastening. The top plate of this drum might be cast solid therewith, if desired, as well as separately, except that it would then be heavier, and not so convenient. Projecting upwardly from the top of said drum, at a point directly between the spindle and gate is a stud, $l'$, on which the slotted device $a'$ on the end of the latch A' is mounted. This, when the drum is rotated, operates to draw the latch back from its engagement with the catch C', and permits the gate to be opened or closed by the operation of the other mechanism, as elsewhere described. The disk M is interposed between the supporting-plate N and the drum L. Interlocking projections $l$ and $m$ insure that this disk shall revolve coincidentally with said drum. Orifices $m'$ are formed in this disk, down through which the pawls $o$ on the arms O project, and engage with notches in the plate N when said disk is in position, so that these orifices come underneath said pawls. When said disk is moved around in either direction, it slides underneath the pawl on the side from which it is moving, lifting it out of the corresponding orifice therein and disengaging it from the notch in the plate N underneath. The other pawl moves around in said orifice, and when the movement is completed engages in another notch, as will be presently described. The supporting bolt and plate N is secured fast to the post B, as shown, and has a spindle, $n$, (supported at the top by the bracket N',) which serves as a shaft around which the parts L, M, and O revolve. In the rim of this plate are three pairs of notches, with which the pawls $o$ are adapted to engage when said pawls and the orifices in the disk M are in the proper relative positions. The pawls are shown in engagement with the central pair of these notches in Fig. 8, and all three pairs are shown in plan in Fig. 7. The arms O are pivoted on the spindle $n$ between the drum L and the disk M, and are provided, as before stated, with pawls $o$, which are adapted, when the gate is in position, to pass down through the orifices $m'$ in the disk M and enter the notches in the rim of the plate N. Each pawl is also adapted to pass down through the corresponding orifice and enter the corresponding notch of its pair when the mechanism has been forced into the position shown by Fig. 5, and thus hold the drum, disk, and arm to which it is attached in the position shown until the gate and other arm come around into the position shown by the dotted lines, when the pawl on the other arm will again drop through its orifice and enter the notch, preventing any further movement on the part of the gate. Thus it will be seen that, though the pressure of the vehicle-wheel upon the bail-like rod is but momentary, the mechanism (which is of course fully operated each time the bail-like rod is pressed down) will be held securely in operated position and pull the gate around, notwithstanding that the pressure upon the trip-rod is relieved much sooner than the movement of the gate is completed.

The operation of my said invention may be recapitulated as follows: When a team approaches from, for instance, the side on which the post E is located, the vehicle forces the bail-like rod F over toward the gate until it is flat upon the ground. This, through the rod G, partially rotates the segmental wheel H, which, through the chain I, draws the bar J endwise toward the approaching team. This movement of said bar operates through the rope K to partially rotate the drum L, and thus, through the arm O', draw out the spring $a^5$, which is attached to the opposite side of the gate, and at the same time, through the stud $l$, withdraw the latch A' from engagement with the catch C'. This being accomplished, the taut spring $a^5$ draws the gate around to the post D', where the latch A' engages and holds the gate until released. During the time intervening from the time when the vehicle operates the bail-like rod to the time when the gate is fully opened the pawl $o$ on the arm O' holds said arm in operated position, and keeps the spring in tension, as before described. When the vehicle has passed through the gate, it strikes the bail-like rod F', and this operates all the mechanism in the reverse manner and closes the gate, the only difference being that as in this case the bail-like rod is pressed from instead of toward the gate it does not draw the bar J so far as it does when the team is approaching, and the gate is thus stopped at the post C, instead of the post D'. When the gate closes the end of the latch strikes the slanting side of one of the parts $c$ of the catch C' and raises it up and passes under it, when it meets the perpendicular face of the other part $c$, which stops the gate, the other part $c$ dropping back into position and preventing the gate from swinging back in that direction. A pedestrian wishing to pass through has simply to bear downward on the handle $a^3$, which presses down the latch and allows the gate to be swung in either direction. The springs immediately reshut the gate upon its being released.

It will of course be readily understood that the foregoing description of the operation of the gate is equally applicable when the vehicle is approaching from one direction as the other, as the gate always opens from the team and closes reversely.

When for any reason it is desired to shorten or lengthen the springs $a^4\text{-}a^5$ it can be done by loosening the nut upon the bolt which holds the angle-irons $a^6$ in position and sliding the angle-iron in either direction the desired distance by means of the slots therein (see Figs. 1 and 5) when they may be secured in position by again tightening the nut.

Having thus fully described my said invention, what I claim as new, and desire to secure by Letters Patent, is—

1. In an automatic gate, the combination, with a supporting-plate and bolt secured to the gate-post and having a drum, L, and arms O mounted thereon, of a rope, K, secured to said mechanism, an operating-bar, J, to which said rope is secured, and clamps $k$, by which said rope is secured to said bar, substantially as shown and specified.

2. In an automatic gate, the combination of the supporting-plate and bolt N, secured to the gate-post, and provided with a spindle, $n$, the drum L, and the arms O, mounted on said spindle, the gate, and a connection between each of said arms and said gate, substantially as set forth.

3. In an automatic gate, the combination of the gate, its post, the supporting-plate N, having notches in its edge, and a spindle, $n$, the arms O, mounted on said spindle and having pawls $o$, and the disk M, also mounted on said spindle and having orifices, through which said pawls will drop and engage with notches in the plate N, substantially as described, and for the purposes specified.

4. The combination of the gate, the supporting-plate N, having a spindle, $n$, the arms O, mounted on said spindle, and the springs $a^4$ and $a^5$, connecting said arms to said gate, substantially as shown and described, and for the purposes specified.

5. The combination of the gate, the arms O, mounted on a vertical pivot, the springs $a^4$ and $a^5$, connecting said gate and said arms, and adjustable irons $a^6$, by which said springs are secured to said gate, and whereby the tension of said springs can be regulated, substantially as set forth.

6. The combination of the gate, the post B, the bail-like rods, the bar J, means for connecting said bail-like rods and said bar, the rope K, the drum L, the support N, the arms O, and means for connecting said arms and said gate, substantially as set forth.

7. In an automatic gate, the combination of the gate, its post, a supporting-plate, N, secured to said post and provided with a spindle, $n$, arms O O', mounted on said supporting device and extending out one on each side of the gate, and a spring-connection between each of said arms and its side of said gate, substantially as set forth.

In witness whereof I have hereunto set my hand and seal, at Indianapolis, Indiana, this 16th day of August, A. D. 1883.

THOMAS R. COOK. [L. S.]

In presence of—
C. BRADFORD,
E. W. BRADFORD.